(12) United States Patent
Calder

(10) Patent No.: US 8,382,039 B2
(45) Date of Patent: Feb. 26, 2013

(54) TURBOMACHINE NACELLE AND ANTI-ICING SYSTEM AND METHOD THEREFOR

(75) Inventor: David Patrick Calder, Baltimore, MD (US)

(73) Assignee: MRA Systems Inc., Baltimore, MD (US)

( * ) Notice: Subject to any disclaimer, the term of this patent is extended or adjusted under 35 U.S.C. 154(b) by 492 days.

(21) Appl. No.: 12/649,568

(22) Filed: Dec. 30, 2009

(65) Prior Publication Data

US 2011/0168843 A1 Jul. 14, 2011

(51) Int. Cl.
*B64D 15/02* (2006.01)
(52) U.S. Cl. .............. 244/134 B; 244/134 R; 60/39.093
(58) Field of Classification Search .............. 244/134 R, 244/134 B; 60/39.093; 701/14; 702/24
See application file for complete search history.

(56) References Cited

U.S. PATENT DOCUMENTS

| | | | | |
|---|---|---|---|---|
| 3,933,327 A * | 1/1976 | Cook et al. | ................. | 244/134 B |
| 3,981,466 A * | 9/1976 | Shah | ......................... | 244/134 R |
| 4,738,416 A * | 4/1988 | Birbragher | ................. | 244/134 B |
| 5,228,643 A * | 7/1993 | Manda et al. | ............. | 244/134 B |
| 5,841,079 A * | 11/1998 | Parente | ......................... | 181/214 |
| 5,934,617 A | 8/1999 | Rutherford | | |
| 6,079,670 A * | 6/2000 | Porte | ......................... | 244/134 B |
| 6,131,855 A * | 10/2000 | Porte | ......................... | 244/134 B |
| 6,194,685 B1 | 2/2001 | Rutherford | | |
| 6,330,986 B1 | 12/2001 | Rutherford et al. | | |
| 6,371,411 B1 * | 4/2002 | Breer et al. | ................ | 244/134 R |
| 6,457,676 B1 * | 10/2002 | Breer et al. | ................ | 244/134 R |
| 6,698,691 B2 * | 3/2004 | Porte | ......................... | 244/134 B |
| 7,629,558 B2 | 12/2009 | Petrenko | | |
| 7,673,832 B2 * | 3/2010 | Meister | ...................... | 244/123.1 |
| 7,922,126 B2 * | 4/2011 | Meister | ........................ | 244/208 |
| 2002/0047070 A1 * | 4/2002 | Breer et al. | ................ | 244/134 R |
| 2002/0179773 A1 * | 12/2002 | Breer et al. | ................ | 244/134 R |
| 2007/0221788 A1 * | 9/2007 | Meister | ........................ | 244/208 |
| 2009/0277897 A1 | 11/2009 | Lashmore et al. | | |
| 2010/0116943 A1 * | 5/2010 | Meister | ........................ | 244/208 |
| 2010/0124494 A1 * | 5/2010 | Howarth et al. | ........... | 415/213.1 |

* cited by examiner

*Primary Examiner* — Philip J Bonzell
(74) *Attorney, Agent, or Firm* — Hartman Global IP Law; Gary M. Hartman; Domenica N. S. Hartman

(57) ABSTRACT

An anti-icing system for a nacelle of an aircraft engine. The nacelle has an inlet lip that defines a leading edge of the nacelle, and further has an annular-shaped cavity adjacent and delimited in part by an interior surface of the inlet lip. An anti-icing system is located within the cavity and includes a manifold with a cross-sectional shape that conforms to the interior surface of the inlet lip. A wall of the manifold faces the interior surface of the inlet lip, and air is conducted to the manifold to cause heating of the inlet lip via the manifold wall.

19 Claims, 2 Drawing Sheets

TURBOMACHINE NACELLE AND ANTI-ICING SYSTEM AND METHOD THEREFOR

BACKGROUND OF THE INVENTION

The present invention relates to turbomachinery, and more particularly to anti-icing and de-icing systems for aircraft engine nacelles, of which at least a portion may be fabricated from a composite material.

High-bypass turbofan engines are widely used for high performance aircraft that operate at subsonic speeds. As schematically represented in FIG. 1, a high-bypass turbofan engine 10 includes a large fan 12 placed at the front of the engine 10 to produce greater thrust and reduce specific fuel consumption. The fan 12 serves to compress incoming air 14, a portion of which flows into a core engine (gas turbine) 16 that includes a compressor section 18 containing low and high pressure compressor stages 18A and 18B to further compress the air, a combustion chamber 20 where fuel is mixed with the compressed air and combusted, and a turbine section 22 where a high pressure turbine 22A extracts energy from the combustion gases to drive the high pressure stages 18B of the compressor section 18 and a low pressure turbine 22B extracts energy from the combustion gases to drive the fan 12 and the low pressure stages 18A of the compressor section 18. A larger portion of the air that enters the fan 12 is bypassed to the rear of the engine 10 to generate additional engine thrust. The bypassed air passes through an annular-shaped bypass duct 24 that contains one or more rows of stator vanes, also called outlet guide vanes 28 (OGVs), located immediately aft of the fan 12 and its fan blades 26. The fan blades 26 are surrounded by a fan cowling or nacelle 30 that defines the inlet duct 32 to the turbofan engine 10 as well as a fan nozzle 34 for the bypassed air exiting the bypass duct 24.

The nacelle 30 is an important structural component whose design considerations include aerodynamic criteria as well as the ability to withstand foreign object damage (FOD). For these reasons, it is important to select appropriate constructions, materials and assembly methods when manufacturing the nacelle 30. Various materials and configurations have been considered, with metallic materials and particularly aluminum alloys being widely used. Composite materials have also been considered, such as graphite-reinforced epoxies, as they offer the advantage of significant weight reduction. However, in order to be meet aerodynamic and structural criteria, nacelles formed of composite materials encounter certain challenges. For example, laminar flow over wings, nacelles, and other surfaces is desirable to promote engine efficiency and improve specific fuel consumption (SFC). To achieve laminar flow on the nacelle, steps and gaps should be absent in its outer surface, from the inlet lip 36 to the maximum diameter 44 of the nacelle 30, or at minimum the length of the inlet outer barrel section immediately aft of the inlet lip 36. Though composites and their fabrication processes are well suited for producing single piece parts of this size with the required contour control and part weight, composite materials alone have not been capable of providing the impact resistance necessary to reliably survive in-flight bird strikes.

An additional issue concerning aircraft engine nacelles is that they are subject to icing conditions, particularly the nacelle leading edge at the inlet lip (36 of FIG. 1) while the engine is on the ground and especially under flight conditions. One well known approach to removing ice build-up (de-icing) and preventing ice build-up (anti-icing) on the nacelle inlet lip has been through the use of a hot air bleed system. An example is schematically represented in FIG. 1, in which engine-supplied bleed air flow is drawn from the compressor section 18 through piping 38 to the inlet lip 36, where the hot bleed air contacts the internal surface of the inlet lip 36 to heat the lip 36 and remove/prevent ice formation. The piping 38 includes a tube arrangement commonly referred to as a piccolo tube 40, which resides in an annular-shaped cavity of the nacelle 30 sometimes referred to as the D-duct 42. The tube 40 completely fills the D-duct 42 with the hot bleed air to ensure adequate heating of the inlet lip 36. While this type of system is effective, it requires a large amount of bleed air to fill the D-duct 42 and provide the thermal energy necessary to perform the anti-icing and de-icing functions. The hot air bled from the engine 10 results in a corresponding negative impact on engine performance and detracts from engine efficiency (SFC). Additionally, hot air bleed systems of the type represented can incur a significant weight penalty.

As an alternative, some smaller turbofans and turboprop aircraft engines have utilized electrical anti-icing systems, for example, resistance-type heater wires that may be attached to the interior surface of the inlet lip 36, or embedded in a boot bonded and/or mechanically attached to the interior surface of the inlet lip 36, or directly embedded in the inlet lip 36, such that heating of the lip 36 is through thermal conduction. However, such systems generally require excessive energy for de-icing and continuous anti-icing operation on large aircraft engines, such as high-bypass turbofan engines of the type represented in FIG. 1.

BRIEF DESCRIPTION OF THE INVENTION

The present invention provides an anti-icing and de-icing system and method for a nacelle of an aircraft engine, a nonlimiting example of which is a nacelle partially or completely fabricated from composite materials.

According to a first aspect of the invention, the nacelle comprises an inlet lip that defines a leading edge of the nacelle, and an annular-shaped duct within the nacelle adjacent delimited in part by an interior surface of the inlet lip. An anti-icing system is within the duct and comprises a manifold with a cross-sectional shape that conforms to the interior surface of the inlet lip and has a wall that faces the interior surface of the inlet lip. The anti-icing means further comprises means for conducting air to the manifold to cause heating of the inlet lip via the manifold wall.

According to a second aspect of the invention, the above-described construction provides for a method capable of removing and preventing ice build-up on the inlet lip of a nacelle. Such a method entails placing a manifold within an annular-shaped duct within the nacelle adjacent and delimited in part by an interior surface of the inlet lip. The manifold has a cross-sectional shape that conforms to the interior surface of the inlet lip and a wall that faces the interior surface of the inlet lip, and air is conducted to the manifold to cause heating of the inlet lip via the manifold wall.

A technical effect of this invention is the capability of providing an anti-icing system for an aircraft engine nacelle that contributes minimal weight to the engine, while also providing a manifold that serves a dual role of heating the nacelle and providing impact strength and ductility to promote the bird-strike and FOD resistance of the nacelle. In a preferred embodiment, the strength and ductility contributed by the manifold is capable of allowing the construction of the nacelle from composite materials.

Other aspects and advantages of this invention will be better appreciated from the following detailed description.

DETAILED DESCRIPTION OF THE INVENTION

Figure 1:
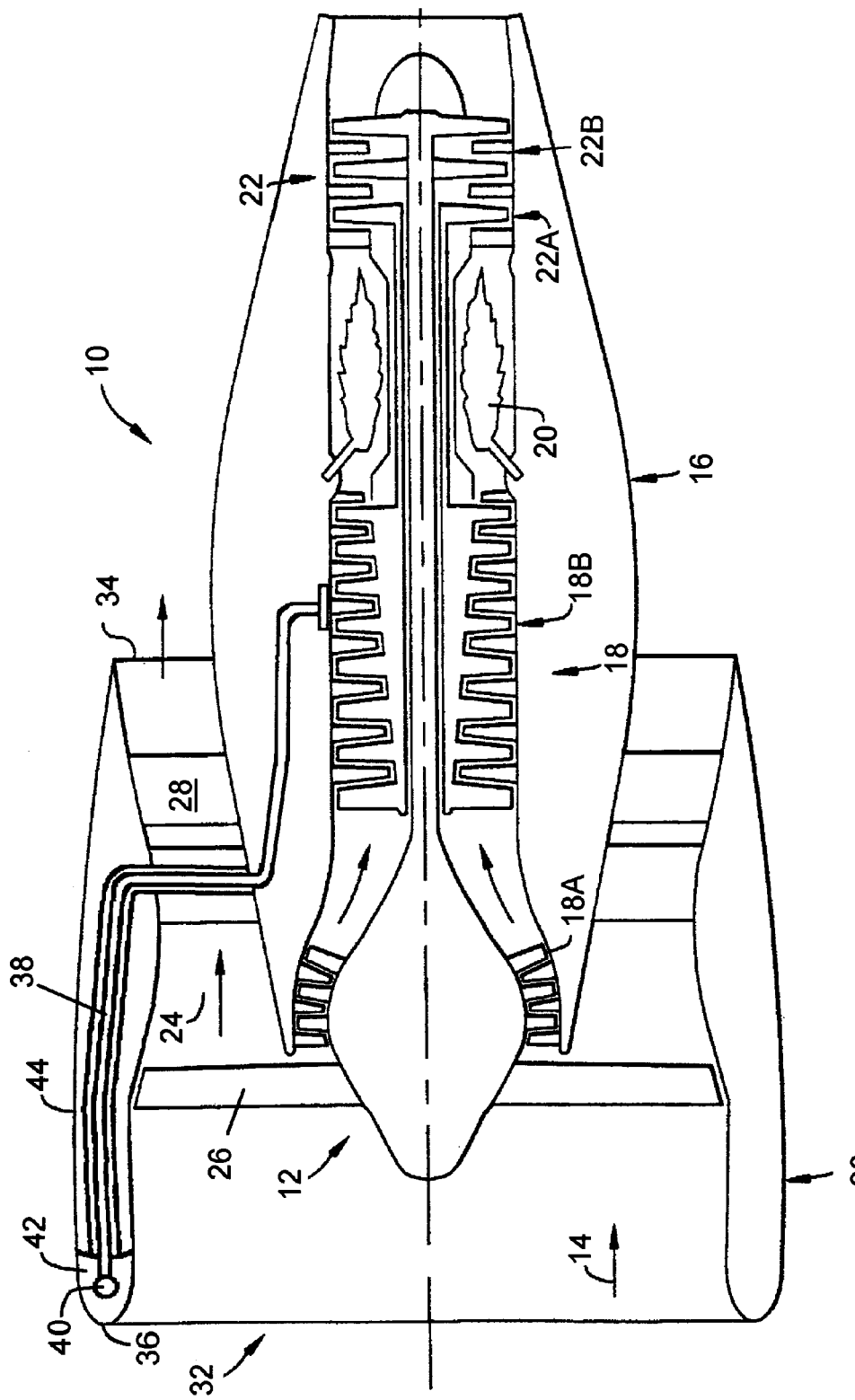
FIG. 1 schematically represents a cross-sectional view of a high-bypass turbofan engine.
Figure 2:
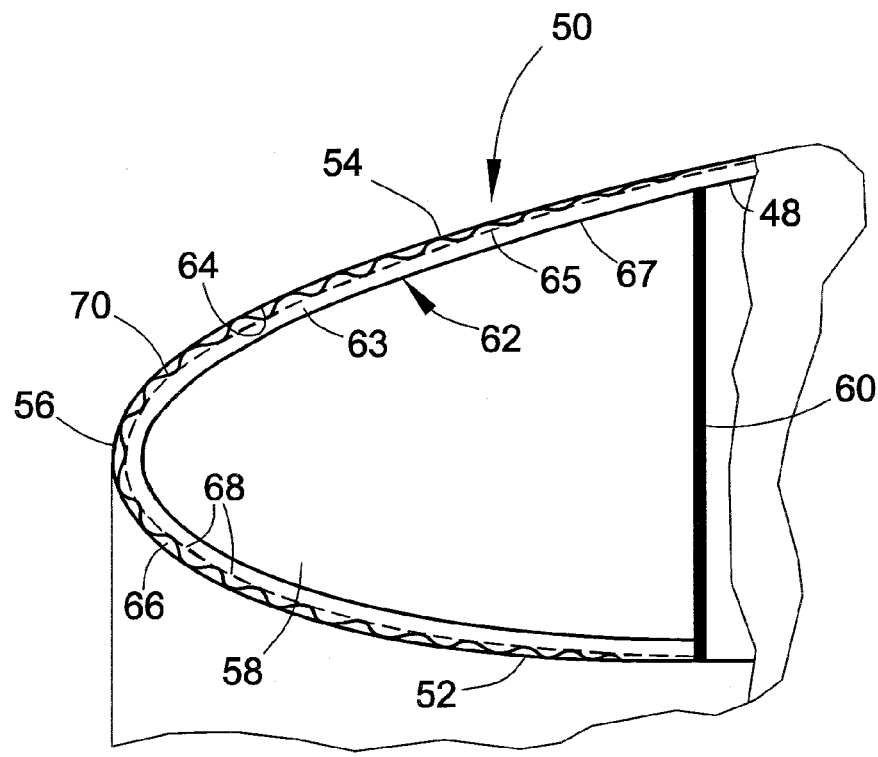
FIG. 2 is a detailed view showing a cross-section of a nacelle inlet lip of a turbofan engine in accordance with an embodiment of the invention.
Figure 3:
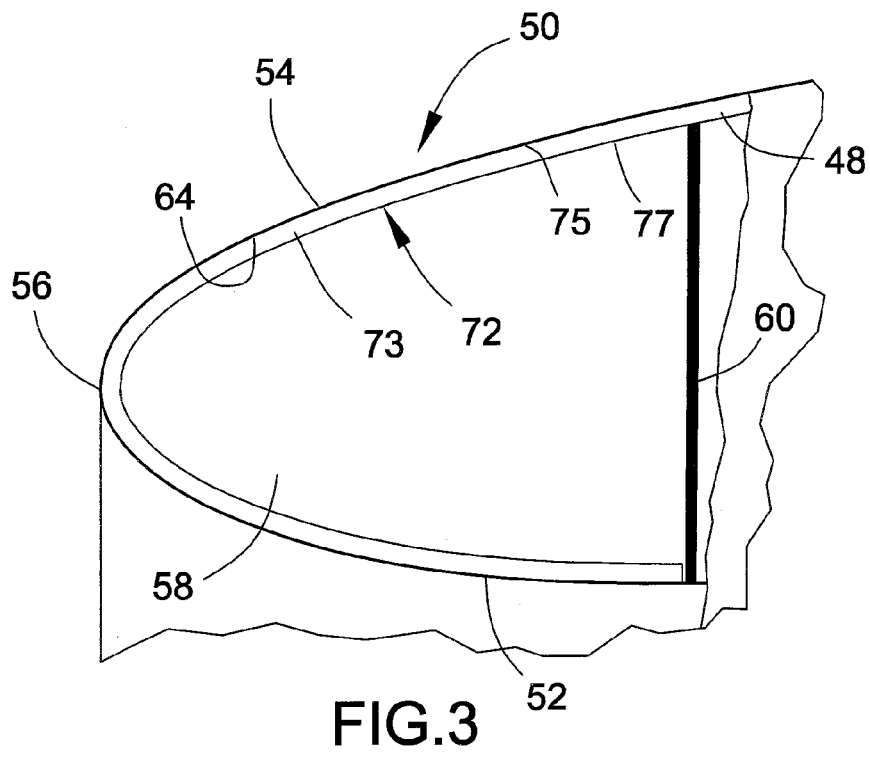
FIG. 3 is a detailed view showing a cross-section of a nacelle inlet lip of a turbofan engine in accordance with another embodiment of the invention.

FIGS. 2 and 3 represent embodiments of the present invention by which an anti-icing capability is provided in combination with an aircraft engine nacelle that may be manufactured so that at least its section at the inlet lip is fabricated from a composite material. The invention is particularly well suited for use in a high-bypass turbofan engine, an example of which is the turbofan engine 10 represented in FIG. 1, though it should be understood that other applications are foreseeable. For convenience, the invention will be described with reference to the engine 10 in FIG. 1, though modified by details of the invention described in reference to FIGS. 2 and 3.

As noted above, a preferred aspect of the invention is the ability to produce a nacelle, or at least that portion of the nacelle that forms its leading edge at the inlet lip, from a composite material. Preferred composite materials are believed to include continuous fiber-reinforced composites capable of benefiting from the temperature capability and impact resistance of advanced matrix materials. The fiber reinforcement component of the composite material may be produced with known fiber materials to have a desired fiber architecture. For example, carbon (graphite) fibers are believed to be a particularly suitable reinforcement material, though other fiber materials could be used in addition to or in place of carbon fibers, including, glass and polymer (e.g., an aramid such as Kevlar®) fibers. The fiber architecture can be produced using known fabric weaving and braiding techniques, including three-dimensional braiding or weaving techniques that are capable of promoting through-plane heat transfer through the thickness of the nacelle. The principle role of the matrix material in the composite is to contribute to the structural strength and other physical properties of the fiber reinforcement material as well as the composite structure as a whole. The matrix material should also be capable of curing at temperatures and under conditions that will not thermally degrade or otherwise be adverse to the fiber reinforcement material. On this basis, particularly suitable resins materials are believed to be thermoplastics such as poly(aryl) etheretherketone (PEEK), poly(aryl)etherketoneketone (PEKK), polyphenylene sulfide (PPS), polyimides, and epoxies, though the use of other matrix materials is foreseeable.

According to another preferred aspect of the invention, at least the outer section of the nacelle inlet lip is produced as a single piece to eliminate any steps or gaps that would interfere with laminar flow across its surface. More particularly, the nacelle is preferably formed to have a continuous single-piece composite construction starting at its inlet lip and continuing aftward to the portion defining the maximum diameter of the nacelle (identified by 44 in FIG. 1). Suitable methods for producing the nacelle (or at least that portion formed of a composite material) include resin transfer molding (RTM), compression molding, autoclave curing, vacuum-assisted resin transfer molding (VaRTM), and tape placement and automated ply placement techniques. Finally, a core material (not shown), such as a lightweight foam or honeycomb polymeric material, more be incorporated within the laminate structure of the nacelles 50 and 70, as is common for aircraft engine nacelle components such as engine inlets, thrust reversers, core cowls, and transcowls, as well as other aerostructures including acoustic panels. In view of the materials noted above, the nacelle can be considerably lighter than nacelles formed of aluminum or other metal alloys conventionally used in the prior art. The thickness of the nacelle should be sufficient to provide structural integrity to the nacelle, without unnecessarily contributing excessive weight. Though a wide range of thicknesses is possible, a typical range is about 1.5 to about 2.5 millimeters.

As noted above, a particular aspect of the invention is to provide an anti-icing capability in combination with a composite nacelle of the type described above. With reference to FIG. 2, a cross-section of a nacelle 50 represents a first embodiment of the invention. As with the prior art nacelle 30 represented in FIG. 1, the nacelle 50 defines the inlet duct 52 of the turbofan engine, as well as a bypass duct and fan nozzle (not shown in FIG. 2) through which bypassed air flows. Also similar to FIG. 1, the nacelle 50 is shown as defining an annular-shaped cavity 58 that is radially delimited by the inlet duct 52 and an outer barrel 54 of the nacelle 50, and longitudinally delimited by the inlet lip 56 of the nacelle 50 and a bulkhead 60 that spans the inlet duct 52 and outer barrel 54 aft of the inlet lip 56. As previously discussed, the nacelle 50 and particularly its leading edge at the inlet lip 56 are subject to icing conditions while the engine is on the ground and under flight conditions. In contrast to the anti-icing technique described for FIG. 1, in which the D-duct 42 is entirely filled with hot bleed air, the embodiment of FIG. 2 employs an anti-icing system that includes a manifold 62 configured to provide more localized heating of that portion of the nacelle 50 most susceptible to icing, namely, the inlet lip 56 and portions of the inlet duct 52 and outer barrel 54 just aft of the inlet lip 56. The manifold 62 utilizes engine bleed air to heat the inlet lip 56, such as hot bleed air drawn from the compressor section or other suitable source of hot air within the engine. The bleed air is represented as being drawn through a conduit 48, which can be routed similar to the piping 38 of FIG. 1. However, the manifold 62 is configured to be effective using much less bleed air than required by FIG. 1, thereby reducing the impact on engine performance and engine efficiency. As such, the conduit 48 is not required to be as large as the piping 38 of FIG. 1, and other means of conducting bleed air to the manifold 62 could be used.

As represented in FIG. 2, the manifold 62 is configured to have an annular shape corresponding to the shape of the cavity 58, and a U-shaped cross-section closely conforming to the interior surface 64 of the cavity 58 defined by the inlet lip 56 and the adjacent portions of the inlet duct 52 and outer barrel 54 of the nacelle 50. Furthermore, the manifold 62 is hollow to allow bleed air flow within its interior cavity 63. As represented in FIG. 2, the cavity 63 within the manifold 62 has a U-shaped cross-section and a minimal internal volume as a result of the inner wall 67 of the manifold 62 closely conforming to the wall 65 facing the inlet lip 56. The manifold 62 is in close proximity to the interior surface 64, resulting in a small annular gap 66 between the manifold wall 65 and the interior surface 64. A suitable width for the gap 66 is believed to be up to about fifteen millimeters, with a preferred range being about two to about six millimeters. The manifold 62 has a relatively thin cross-section, and its walls 65 and 67 can be formed from a thin gage metal alloy, for example, an aluminum alloy, titanium alloy or another high temperature corrosion resistant alloy. The manifold 62 can be fabricated using known processes, including vacuum brazing and/or diffusion bonding.

The wall 65 of the manifold 62 facing the interior surface 64 contains numerous holes 68 of sufficient size and in a suitable pattern to cause hot bleed air flowing through the manifold cavity 63 to be blown directly at the interior surface 64 of the inlet lip 56, thereby achieving heat transfer to the inlet lip 56 via forced convection. The hole pattern may focus the bleed air at the leading edge of the inlet lip 56, though more preferably the air is uniformly dispersed over the entire inlet lip 56. Suitable hole sizes and hole pattern densities will depend on the size and configuration of the inlet lip 56 and the bleed air flow rate and source. Following impingement of the inlet lip 56, the bleed air is able to escape to atmosphere through exhaust vents and other openings inherently present in the construction of the nacelle 50.

Other than serving as a conduit for the hot bleed air, the manifold 62 is not required to have a direct heat transfer function. As such, materials can be chosen for the manifold 62 based on criteria other than thermal conductivity. As such, the manifold 82 could be fabricated from thermal-insulating materials. However, in view of the preferred composite construction of the nacelle 50 at and surrounding the inlet lip 56, the materials and construction for the manifold 62 are preferably chosen on the basis of promoting its impact strength and ductility, which in turn serves to promote the ability of the inlet lip 56 to resist foreign impact damage, including bird strikes. To provide a dual role of promoting the bird-strike and FOD resistance of the nacelle 50 and heating the nacelle 50 to provide an anti-icing function, the manifold 62 represented in FIG. 2 is equipped with stiffening elements 70 located in the otherwise open air flow path within the gap 66 between the wall 65 of the manifold 62 and the interior surface 64 of the inlet lip 56. The stiffening elements 70 are preferably present at appropriate locations within the gap 66 to structurally support and space the inlet lip 56 apart from the manifold 62. As represented in FIG. 2, the stiffening elements 70 may be in the form of sinusoidal-shaped elements, such as one or more panels, strips or ribbons, though it should be understood that additional or alternative stiffening components could be used to promote the impact strength of the inlet lip 56 through the manifold 62.

Various techniques may be employed to mount the manifold 62 within the cavity 58 and adjacent the interior surface 64 of the inlet lip 56. As evident from FIG. 2, the bulkhead 60 can be used to position and locate the manifold 62 within the cavity 58. Alternatively or in addition, the manifold 62 can be directly attached to the interior surface 56, such as with stand-off elements or bosses.

FIG. 3 represents another embodiment for providing an anti-icing capability in combination with a composite nacelle. In contrast to the forced air convection technique of FIG. 2, the embodiment of FIG. 3 relies on direct thermal conduction with the inlet lip 56. Similar to the embodiment of FIG. 2, a manifold 72 is shown in FIG. 3 as having an annular shape corresponding to the shape of the cavity 58, and a U-shaped cross-section closely conforming to the interior surface 64 of the inlet lip 56 and the adjacent portions of the inlet duct 52 and outer barrel 54 of the nacelle 50. As with the manifold 62 of FIG. 2, the manifold 72 is hollow to allow bleed air flow within its interior cavity 73, and the cavity 73 has a U-shaped cross-section of minimal volume as a result of the walls 75 and 77 of the manifold 72 closely conforming to the interior surface 64 of the inlet lip 56. Other aspects of the anti-icing system of FIG. 3 and its manifold 72 can be the same or similar to that described for the manifold 62 of FIG. 2, and as such the following description will focus only on the primary differences between the manifolds 62 and 72 of FIGS. 2 and 3.

In contrast to FIG. 2, the wall 75 of the manifold 72 facing the inlet lip 56 is shown as directly contacting essentially the entire interior surface 64, such that the annular gap 66 of FIG. 2 is not present between the manifold 72 and the interior surface 64. As such, the wall 75 of the manifold 72 can be produced without holes for forced air heating of the inlet lip 56, though it is foreseeable that holes similar to those in FIG. 2 could be provided to allow for direct contact between the inlet lip 56 and the hot bleed air. However, heating of the inlet lip 56 is primarily the result of the high temperature bleed air heating the manifold wall 75, which in turn heats the inlet lip 56 via thermal conduction. Because of this, preferred materials for the manifold 72 (or at least the wall 75 of the manifold 72) are highly conductive materials, most notably metals including aluminum alloys, titanium alloys and other high temperature corrosion-resistant alloys that are also capable of promoting the ability of the manifold 72 and the inlet lip 56 to withstand bird strikes and other potential sources of foreign object damage. The manifold 72 can be attached to the interior surface 64 of the inlet lip 56 with an adhesive, with preferred adhesives being those with enhanced thermal conductivity as a result of containing a dispersion of metal and/or ceramic particles to promote heat transfer between the manifold wall 75 and the inlet lip 56.

The bleed air within the manifold cavity 73 can be allowed to escape to atmosphere through one or more openings (not shown) in the manifold 72 that are sufficiently small to ensure sufficient dwell time within the manifold 72 to heat the manifold wall 75 and also control the air flow rate through the manifold 72, such that much less bleed air is used than is required by the prior art of FIG. 1. Consequently, the manifold 72 is capable of having a reduced impact on engine performance and engine efficiency.

In view of the above, it should be appreciated that each of the anti-icing systems described in FIGS. 2 and 3 offers several distinct advantages over the prior art system of FIG. 1. For example, the systems use manifolds 62 and 72 that can be relatively small and closely conform to the inlet lip 56, thereby reducing the bleed air necessary to achieve an anti-icing capability at the inlet lip 56. The lightweight construction of the manifolds 62 and 72 can be further promoted by the choice of materials and fabrication techniques used in their construction. The manifolds 62 and 72 can be constructed of relatively thin-gage materials and yet provide sufficient impact strength and ductility to promote the bird-strike and FOD resistance of the inlet lip 56, allowing the lip 56 to be formed of a composite material, and more preferably a continuous single-piece composite construction whose outer surface lacks any steps or gaps that would interfere with laminar flow across its surface.

While the invention has been described in terms of specific embodiments, other forms could be adopted by one skilled in the art. For example, the physical configuration of the turbofan engine 10 and nacelle 30 could differ from those shown, and materials and processes other than those noted could be used. Therefore, the scope of the invention is to be limited only by the following claims.

The invention claimed is:

1. A nacelle for installation at an inlet to an aircraft engine, the nacelle comprising:
    an inlet lip defining a leading edge of the nacelle;
    an annular-shaped cavity within the nacelle adjacent and delimited in part by an interior surface of the inlet lip; and
    an anti-icing system within the cavity, the anti-icing system comprising a manifold with a cross-sectional shape that conforms to the interior surface of the inlet lip comprising a U-shaped first wall that closely conforms and faces the interior surface of the inlet lip and a second wall that closely conforms to the first wall, and means for conducting air within an interior cavity defined by the first wall and the second wall of the manifold to cause heating of the inlet lip via the first wall, wherein the air conducting means does not fill the cavity within the nacelle with the air conducted thereby.

2. The nacelle according to claim 1, wherein the manifold has a U-shaped cross-section.

3. The nacelle according to claim 1, wherein the first wall of the manifold is directly bonded to the interior surface of the inlet lip, and the first wall is adapted to cause heating of the inlet lip by thermal conduction.

4. The nacelle according to claim 1, wherein the first wall of the manifold lacks holes for directing air at the interior surface of the inlet lip.

5. The nacelle according to claim 1, wherein the conducting means draws hot bleed air from the aircraft engine and conducts the hot bleed air to the manifold.

6. The nacelle according to claim 1, wherein the first wall of the manifold is spaced apart from the interior surface of the inlet lip to define a gap therebetween, the manifold comprising holes in the first wall thereof, the holes being adapted to direct air within the manifold at the interior surface to cause heating of the inlet lip by forced convection.

7. The nacelle according to claim 6, wherein the gap is uniform between the first wall and the interior surface of the inlet lip.

8. The nacelle according to claim 6, wherein the anti-icing system further comprises stiffening means within the gap for structurally supporting the inlet lip and spacing the inlet lip apart from the manifold.

9. The nacelle according to claim 8, wherein the stiffening means comprises a sinusoidal element.

10. The nacelle according to claim 1, wherein at least the inlet lip of the nacelle is formed of a composite material.

11. The nacelle according to claim 10, wherein the composite material comprises a reinforcement fiber material in a thermoplastic matrix.

12. The nacelle according to claim 1, wherein the nacelle is installed in the aircraft engine and surrounds a fan of the aircraft engine.

13. The nacelle according to claim 12, wherein the aircraft engine is a high-bypass gas turbine engine and the nacelle surrounds a high-bypass duct of the aircraft engine.

14. A method of removing and preventing ice build-up on an inlet lip that defines a leading edge of a nacelle of an aircraft engine, the method comprising:
placing a manifold within an annular-shaped cavity within the nacelle adjacent and delimited in part by an interior surface of the inlet lip, the manifold having a cross-sectional shape that conforms to the interior surface of the inlet lip comprising a U-shaped first wall that closely conforms and faces the interior surface of the inlet lip and a second wall that closely conforms to the first wall; and
conducting air within an interior cavity defined by the first wall and the second wall of the manifold to cause heating of the inlet lip via the first wall, wherein the cavity within the nacelle is not filled with the air.

15. The method according to claim 14, further comprising bonding the first wall of the manifold to the interior surface of the inlet lip, wherein the air conducted to the manifold heats the first wall to cause heating of the inlet lip by thermal conduction.

16. The method according to claim 14, wherein the conducting step comprises drawing hot bleed air from the aircraft engine and conducting the hot bleed air to the manifold.

17. The method according to claim 14, further comprising forming at least the inlet lip of the nacelle of a composite material.

18. The method according to claim 14, wherein the first wall of the manifold is spaced apart from the interior surface of the inlet lip to define a gap therebetween, the manifold comprises holes in the first wall thereof, and the air conducted to the manifold is directed by the holes at the interior surface of the inlet lip to cause heating of the inlet lip by forced convection.

19. The method according to claim 18, further comprising installing stiffening means within the gap to structurally support the inlet lip and space the inlet lip apart from the manifold.

\* \* \* \* \*